US009535885B2

(12) United States Patent
Bassemir et al.

(10) Patent No.: US 9,535,885 B2
(45) Date of Patent: Jan. 3, 2017

(54) DYNAMICALLY CUSTOMIZING A DIGITAL PUBLICATION

(75) Inventors: Richard T. Bassemir, Austin, TX (US); Beth L. Hoffman, Cedar Park, TX (US); Terry A. Owings, Leander, TX (US); Artis L. Walker, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 750 days.

(21) Appl. No.: 13/536,636

(22) Filed: Jun. 28, 2012

(65) Prior Publication Data

US 2014/0006925 A1    Jan. 2, 2014

(51) Int. Cl.
*G06F 17/00* (2006.01)
*G06F 17/21* (2006.01)

(52) U.S. Cl.
CPC .................. *G06F 17/218* (2013.01)

(58) Field of Classification Search
CPC .................................................. G06F 17/218
USPC ................................................ 715/825, 234
See application file for complete search history.

(56) References Cited

U.S. PATENT DOCUMENTS

| 2006/0294223 | A1* | 12/2006 | Glasgow et al. | 709/224 |
|---|---|---|---|---|
| 2007/0044011 | A1* | 2/2007 | Cottrille et al. | 715/511 |
| 2007/0220419 | A1* | 9/2007 | Stibel et al. | 715/511 |
| 2007/0273558 | A1* | 11/2007 | Smith et al. | 340/995.1 |
| 2008/0046458 | A1* | 2/2008 | Tseng et al. | 707/102 |
| 2009/0241035 | A1* | 9/2009 | Tseng et al. | 715/753 |
| 2010/0041419 | A1* | 2/2010 | Svendsen et al. | 455/456.3 |
| 2010/0050064 | A1 | 2/2010 | Liu et al. | |
| 2010/0076968 | A1* | 3/2010 | Boyns et al. | 707/732 |
| 2010/0121718 | A1* | 5/2010 | AlanDietz | 705/14.58 |
| 2011/0044563 | A1* | 2/2011 | Blose et al. | 382/306 |
| 2011/0112671 | A1 | 5/2011 | Weinstein | |

(Continued)

FOREIGN PATENT DOCUMENTS

| CN | 101944135 A | 1/2011 |
|---|---|---|
| CN | 102047249 A | 5/2011 |

(Continued)

OTHER PUBLICATIONS

PCT/IB2013/055249, International Search Report & Written Opinion, Jun. 26, 2013.

*Primary Examiner* — Stephen Hong
*Assistant Examiner* — Marshon Robinson
(74) *Attorney, Agent, or Firm* — Kunzler Law Group; Steven L. Bennett

(57) ABSTRACT

A method for dynamically customizing a digital publication includes sequentially presenting content of a digital publication by one or more of visually displaying the content on an electronic display and audibly narrating the content. The method includes detecting a customization tag in the content. The customization tag indicates a portion of the content customizable according to a geographic location. The customization tag is associated with customization content. The customization content is associated with the geographic location. The method includes accessing the customization content associated with the customization tag. The customization content includes one or more of text content, visual content, and audible content. The method includes presenting the customization content at a point in the content indicated by the customization tag.

17 Claims, 8 Drawing Sheets

(56) References Cited

U.S. PATENT DOCUMENTS

| | | |
|---|---|---|
| 2011/0153047 A1 | 6/2011 | Cameron et al. |
| 2011/0167336 A1* | 7/2011 | Aitken et al. ................. 715/239 |
| 2011/0184811 A1* | 7/2011 | Patwa et al. ............... 705/14.66 |
| 2011/0191667 A1* | 8/2011 | Sahota et al. ................. 715/234 |
| 2011/0195388 A1 | 8/2011 | Henshall et al. |
| 2012/0151351 A1* | 6/2012 | Kilroy et al. ................. 715/733 |
| 2013/0117665 A1* | 5/2013 | Tagliaferri et al. ........... 715/255 |
| 2013/0151950 A1* | 6/2013 | McEvilly et al. ............ 715/234 |
| 2013/0290483 A1* | 10/2013 | Svendsen et al. ............ 709/217 |
| 2014/0095580 A1* | 4/2014 | Sartini et al. ................. 709/203 |

FOREIGN PATENT DOCUMENTS

| | | |
|---|---|---|
| WO | 2008086268 A1 | 7/2008 |
| WO | 2011028424 A1 | 3/2011 |

\* cited by examiner

500 ↘

502

Janet surveyed the <geographic city> skyline, the last vestiges of sunlight casting an orange glow onto the <geographic vegetation> around her. She smoothed the fabric of her <geographic outfit> and set off down the street, passing the <geographic sports team> stadium, its walls rising up above her, echoing the sound of her <geographic footwear> scraping on the pavement.

Janet surveyed the Phoenix skyline, the last vestiges of sunlight casting an orange glow onto the cactuses around her. She smoothed the fabric of her t-shirt and shorts and set off down the street, passing the Sun's stadium, its walls rising up above her, echoing the sound of her flip-flops scraping on the pavement.

Janet surveyed the Manhattan skyline, the last vestiges of sunlight casting an orange glow onto the oak trees around her. She smoothed the fabric of her jacket and pants and set off down the street, passing the Knick's stadium, its walls rising up above her, echoing the sound of her boots scraping on the pavement.

FIG. 5C

DYNAMICALLY CUSTOMIZING A DIGITAL PUBLICATION

FIELD

The subject matter disclosed herein relates to a digital publication and more particularly to dynamically customizing a digital publication.

BACKGROUND

Description of the Related Art

Increasingly, books, magazines, and other publications, are becoming available in digital form. Instead of only having access to a particular publication on paper, a user may obtain a digital version of the particular publication for use with an electronic reader (e-reader) application on a computing device, such as a smartphone, tablet computer, electronic reader, or the like.

An e-reader application may present content of a digital publication in various ways, including audibly narrating text, visually displaying the text, and the like. Due to the electronic nature of these digital publications, they are no longer limited to the words appearing on a printed page.

BRIEF SUMMARY

A method for dynamically customizing a digital publication includes, in one embodiment, sequentially presenting content of a digital publication by one or more of visually displaying the content on an electronic display and audibly narrating the content. In one embodiment, the method includes detecting a customization tag in the content. The customization tag may indicate a portion of the content customizable according to a geographic location. The customization tag may be associated with customization content. The customization content may be associated with the geographic location. In one embodiment, the method includes accessing the customization content associated with the customization tag. The customization content may include one or more of text content, visual content, and audible content. In one embodiment, the method includes presenting the customization content at a point in the content indicated by the customization tag.

In some embodiments, the geographic location comprises a geographic location of a computing device in communication with the electronic display. The computing device may sequentially present the content. In this embodiment, the method further includes obtaining the geographic location of the computing device. In a further embodiment, obtaining the geographic location of the computing device further includes obtaining the geographic location from one or more of a user preference, a Global Positioning System (GPS) device in communication with the computing device, a mobile phone localization process, and a network in communication with the computing device.

In one embodiment, the geographic location includes a user preference. The user preference overrides a geographic location of a computing device in communication with the electronic display. The computing device may sequentially present the content. In one embodiment, the customization tag specifies one or more of a text segment, an audio clip, an audio volume, and an audio duration. In some embodiments, the customization content comprises non-persistent customization content. The non-persistent customization content may be associated with a current geographic location.

In a further embodiment, the current geographic location comprises a first geographic location. In this embodiment, the method further includes presenting the customization content for the customization tag. The customization content may be associated with the first geographic location. In a further embodiment, the method includes detecting the current geographic location change from the first geographic location to a second geographic location different from the first geographic location and presenting the customization content for the customization tag subsequent to detecting the current geographic location change from the first geographic location to the second geographic location. The customization content may be associated with the second geographic location.

In one embodiment, the customization content comprises persistent customization content. The persistent customization content may be associated with a persistent geographic location. In a further embodiment, a current geographic location comprises a first geographic location and the persistent geographic location comprises the first geographic location. In this embodiment, the method further includes presenting the customization content for the customization tag. The customization content may be associated with the first geographic location. In a further embodiment, the method includes detecting the current geographic location change from the first geographic location to a second geographic location different from the first geographic location and presenting the customization content for the customization tag subsequent to detecting the current geographic location change from the first geographic location to the second geographic location. The customization content may be associated with the first geographic location.

In one embodiment, the method includes searching ahead of a current presentation location in the content for the customization tag. The current presentation location comprises a location in the content currently being presented. In a further embodiment, detecting the customization tag in the content further includes detecting the customization tag at a location in the content ahead of the current presentation location. In a further embodiment, the method includes pre-loading the customization content prior to presenting the customization content in response to detecting the customization tag at a location in the content ahead of the current presentation location.

In one embodiment, the method includes referencing a plurality of user preferences wherein the customization content is based at least in part of one or more of the plurality of user preferences. In a further embodiment, the method includes determining the plurality of user preferences based on one or more of audio content stored on a computing device and audio content associated with a user's Internet music account. In one embodiment, the customization content includes one of a character trait, a character name, a location trait, a location name, weather, a song, and a sound effect.

An apparatus for dynamically customizing a digital publication includes, in one embodiment, a presentation module that sequentially presents content of a digital publication by one or more of visually displaying the content on an electronic display and audibly narrating the content. In one embodiment, the apparatus includes a detection module that detects a customization tag in the content. The customization tag may indicate a portion of the content customizable according to a geographic location. The customization tag may be associated with customization content. The customization content may be associated with the geographic location. In one embodiment, the apparatus includes an access module that accesses the customization content associated with the customization tag. The customization content may include one or more of text content, visual content, and audible content. In one embodiment, the apparatus includes a customization module that presents the customization content at a point in the content indicated by the customization tag.

In a further embodiment, the geographic location comprises a geographic location of a computing device in communication with the electronic display. The computing device, in one embodiment, sequentially presents the content and wherein the apparatus further comprises a location module that obtains the geographic location of the computing device. In one embodiment, the apparatus includes a memory storing one or more of the presentation module, the detection module, the access module, and the customization module and a processor in communication with the memory and the electronic display. The processor may execute one or more of the presentation module, the detection module, the access module, and the customization module.

A computer program product comprising a computer readable storage medium having computer readable program code embodied therewith for dynamically customizing a digital publication includes, in one embodiment, computer readable program code for sequentially presenting content of a digital publication by one or more of visually displaying the content on an electronic display and audibly narrating the content. In one embodiment, the computer program product includes detecting a customization tag in the content. The customization tag may indicate a portion of the content customizable according to a geographic location. The customization tag may be associated with customization content. The customization content may be associated with the geographic location. In one embodiment, the computer program product includes accessing the customization content associated with the customization tag. The customization content includes one or more of text content, visual content, and audible content. In one embodiment, the computer program product includes presenting the customization content at a point in the content indicated by the customization tag.

In one embodiment, the computer program product includes searching ahead of a current presentation location in the content for the customization tag. The current presentation location may comprise a location in the content currently being presented. In this embodiment, detecting the customization tag in the content further includes detecting the customization tag at a location in the content ahead of the current presentation location. In one embodiment, the computer program product further includes pre-loading the customization content prior to presenting the customization content in response to detecting the customization tag at a location in the content ahead of the current presentation location.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5A is a schematic block diagram illustrating one embodiment of a digital publication with customization tags in accordance with the present invention;

FIG. 5B is a schematic block diagram illustrating one embodiment of the digital publication of FIG. 5A customized with customization content in accordance with the present invention;

FIG. 5C is a schematic block diagram illustrating another embodiment of the digital publication of FIG. 5A customized with customization content in accordance with the present invention;

DETAILED DESCRIPTION OF THE INVENTION

Figure 1:
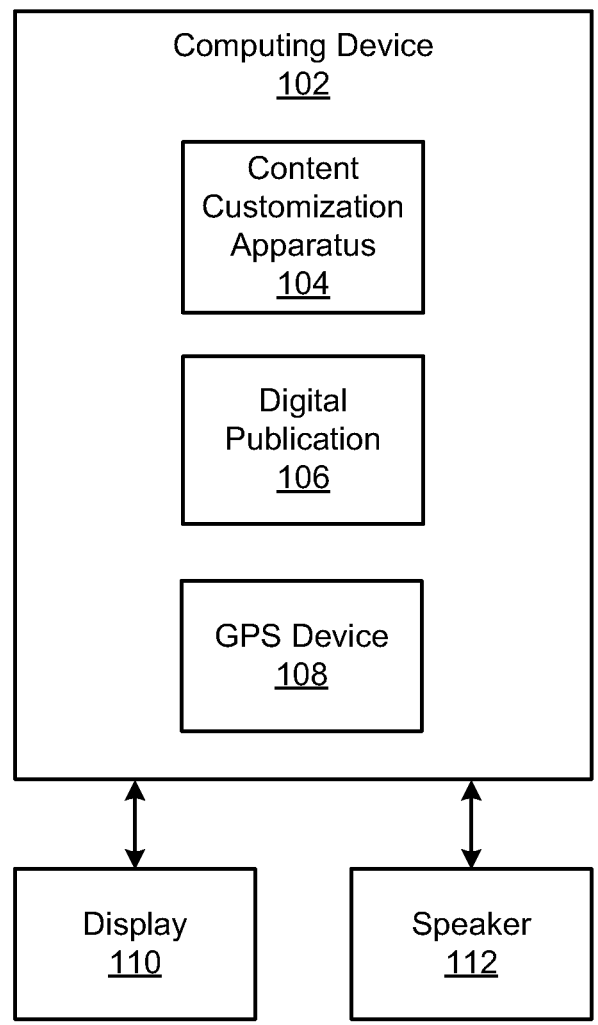
FIG. 1 is a schematic block diagram illustrating one embodiment of system for dynamically customizing a digital publication in accordance with the present invention.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for dynamically customizing a digital publication. In the depicted embodiment, the system 100 includes a computing device 102 in communication with an electronic display 110 and a speaker 112. The computing device 102 includes a content customization apparatus 104, a digital publication 106, and, in one embodiment, a Global Positioning System (GPS) device 108. The content customization apparatus 104 presents content of a digital publication 106 and dynamically customizes the content of the digital publication 106. Specifically, the digital publication 106 may include customization tags in the content. The customization tags may indicate customizable portions of the digital publication 106.

The content customization apparatus 104 may detect a customization tag in the digital publication 106 and access customization content associated with the customization tag. The content customization apparatus 104 may present the customization content during the presentation of the digital publication 106, providing a unique experience for the user. In one embodiment, a customization tag indicates a portion of the content customizable according to a geographic location. In this embodiment, the customization content presented for a customization tag may be associated with, customized according to, and/or specific to the geographic location.

In one embodiment, the computing device 102 includes a GPS device 108 and the content customization apparatus 104 may use an actual geographic location (e.g. where the computing device 102 is currently located) from the GPS device 108 to select the customization content for presentation. In another embodiment, the content customization apparatus 104 may use a user preference for the geographic location. Certain content of the digital publication 106 may be specific to a geographic location and may change each time the content customization apparatus 104 presents the digital publication 106 for different geographic locations.

For example, if the computing device's 102 current location is Dallas, Tex., the content customization apparatus 104 may access customization content specific to Dallas. Therefore, various customization tags that call for customization content involving street names, a city name, weather conditions, clothing, and the like, may be customized for Dallas. As a result, a user may experience various versions of the digital publication 106 depending on the geographic location.

In addition, customization content may also be presented according to user preferences. For example, the content customization apparatus 104 may present background music to certain parts of a story based on a user's music preferences. In one embodiment, the content customization apparatus 104 may present customization content based on elements within the digital publication 106. For example, if the digital publication 106 is a story that describes a dinner in a French restaurant, the content customization apparatus 104 may play French music while presenting the digital publication 106. Customization content may include text, sound effects, music, images, and/or the like.

The computing device 102 may be in communication with an electronic display 110 as depicted. In one embodiment, the content customization apparatus 104 may present content of the digital publication 106 by visually displaying the content on the electronic display 110. For example, the content customization apparatus 104 may display text or images on the electronic display 110. The electronic display 110 may include a liquid crystal display ("LCD") monitor, a plasma monitor, or the like. The electronic display 110 may be embodied separately from the computing device 102 or may be integrated with the computing device 102.

The computing device 102 may be in communication with a speaker 112, or other sound emitting device as depicted. In some embodiments, the content customization apparatus 104 may present content of the digital publication 106 by audibly narrating the content (e.g. text content) and/or audibly playing music and/or sound effects through the speaker 112.

The computing device 102 may include a processor and a memory that stores computer readable programs. The memory may be embodied by volatile memory such as dynamic random access memory ("DRAM"), static random access memory ("SRAM"), or other suitable volatile memory. The processor executes the computer readable programs as is well known to those skilled in the art. The computer readable programs may be tangibly stored in storage in the computing device 102. The storage may include a Solid State Drive ("SSD"), a hard disk drive ("HDD"), an optical storage device, a holographic storage device, a micromechanical storage device, or other non-volatile data storage device. The computing device 102 may be embodied by a server computer, a desktop computer, a laptop computer, a tablet computer, a mobile device, or another computing device 102.

In one embodiment, at least a portion of the content customization apparatus 104 comprises a computer readable program stored on memory of the computing device 102 and executed by a processor of the computing device 102. The content customization apparatus 104 may include, is part of, and/or is included in an electronic-reader (e-reader) application that presents digital publications 106. For example, the content customization apparatus 104 may be embodied as a plug-in to an e-reader application.

The digital publication 106 may be embodied as a file stored on the computing device 102, streamed over a network to the computing device 102, or the like. The digital publication 106 may include text content, audible content such as audio and sounds, and/or visual content such as images or graphics. The digital publication 106 may be a magazine, a newspaper, a novel, a textbook, a children's book, or any other suitable publication. In one embodiment, an author or producer of the digital publication 106 may insert customization tags as described below. Although FIG. 1 depicts a single exemplary digital publication 106, the computing device 102 may store, download, and/or otherwise obtain a plurality of digital publications 106.

The content customization apparatus 104, in other embodiments, may be part of a server accessible by a client through a network. The server may be part of a cloud computing environment accessible by a client. One of skill in the art will recognize other ways of implementing the content customization apparatus 104 for access using a computing device 102.

Figure 2:
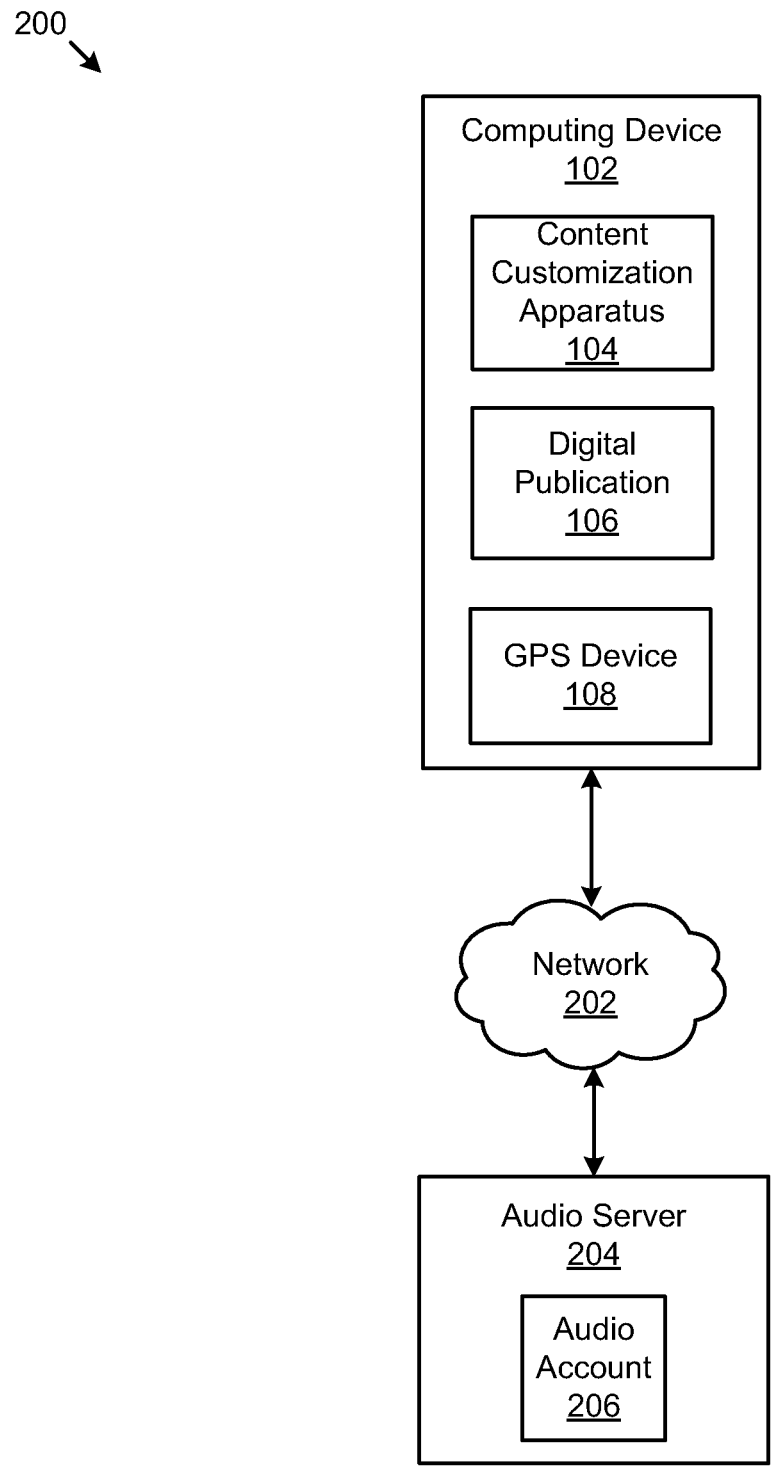
FIG. 2 is a schematic block diagram illustrating another embodiment of a system for dynamically customizing a digital publication in accordance with the present invention.

FIG. 2 is a schematic block diagram illustrating another embodiment of a system 200 for dynamically customizing a digital publication 106. FIG. 2 includes the computing device 102, the content customization apparatus 104, the digital publication 106, and the GPS device 108 of FIG. 1. Moreover, in FIG. 2, the computing device 102 is in communication with a network 202 in communication with an audio server 204. The audio server 204 includes an audio account 206.

In certain embodiments, the content customization apparatus 104 determines user preferences based on audio content associated with the user's audio account 206 hosted on an audio server 204. Furthermore, in one embodiment, the content customization apparatus 104 retrieves audio content from a source external to the computing device 102, such as the audio server 204, to use as customization content. The audio server 204 may be a music streaming service, such as an Internet radio server, and may include a user's song preferences and/or a user's song listening history as part of the user's audio account 206. In one embodiment, the audio server 204 may store a user's songs.

The network 202 may include a communications network such as the Internet, a Local Area Network ("LAN"), a Wireless LAN ("WLAN"), multiple LANs communicating over the Internet, or any other similar communications network. The network 202 may include hardware such as routers, switches, cabling, and other communication hardware. The audio server 204 may host, provide, and/or serve audio content associated with a plurality of audio accounts 206 for a plurality of users. The audio server 204 may include a processor, a memory that stores computer readable programs, storage, and the like.

In one embodiment, the content customization apparatus 104 accesses a user's audio account 206 to determine a user's song preferences. For example, the content customization apparatus 104 may reference a user's song and/or musical genre preferences stored in the user's audio account 206 on the audio server 204. In an embodiment in which the audio server 204 stores a user's songs, the content customization apparatus 104 may also reference a user's songs to determine song/genre preferences. The content customization apparatus 104 may reference a user's song history (e.g. what song's a user has listened to). For example, the content customization apparatus 104 may reference the user's stored songs and/or the user's song playing history and determine that a user enjoys country music and the content customization apparatus 104 may set a song genre preference of a user to country music. The content customization apparatus 104 may log in to the audio account 206 on the audio server 204 with a user's login credentials to obtain user preferences and/or access the user's song playing history.

In one embodiment, the audio server 204 provides a plurality of sound effects. The content customization apparatus 104 may access a sound effect from the audio server 204 for use as customization content during presentation of the digital publication 106. In certain embodiments, the audio server 204 provides a sound effect web service. The content customization apparatus 104 may interface with the sound effect web service to obtain sound effects for use in customizing content of the digital publication 106. As described below, the content customization apparatus 104 may also access songs, sound effects, and other content stored on the computing device 102 in customizing content.

Figure 3:
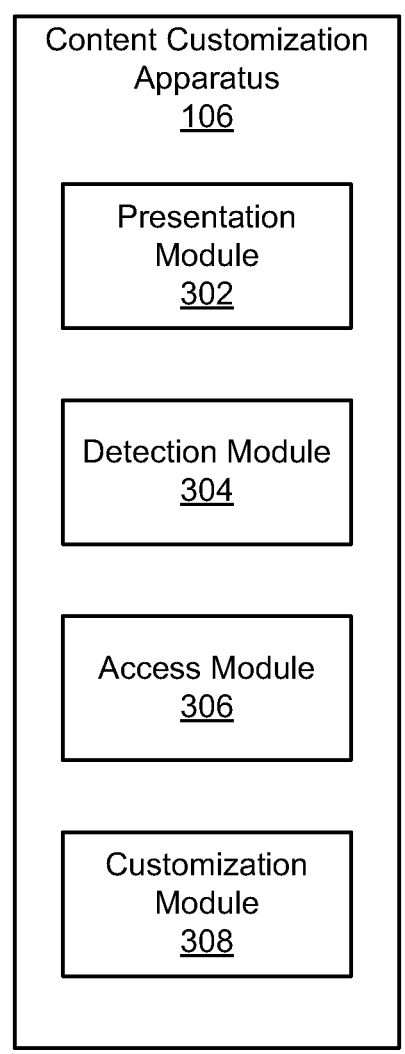
FIG. 3 is a schematic block diagram illustrating one embodiment of an apparatus for dynamically customizing a digital publication in accordance with the present invention.

FIG. 3 is a schematic block diagram illustrating one embodiment of an apparatus 300 for dynamically customizing a digital publication 106. The apparatus 300 includes the content customization apparatus 104 with a presentation module 302, a detection module 304, an access module 306, and a customization module 308, which are described below.

The presentation module 302, in one embodiment, presents content of digital publications 106. The content may include, but is not limited to, text content, visual content, and/or audible content. Text content may include text, visual content may include images, video, graphics, and the like, and audible content may include audio such as spoken words, music, sound effects, and the like.

The presentation module 302 may present the content by visually displaying the content on an electronic display, audibly narrating the content, and/or playing audio or video content. The presentation module 302 may present text content by audibly narrating the text, and/or visually depicted words of the text on the electronic display. Furthermore, the presentation module 302 may present visual content by audibly describing visual content, by graphically depicting or playing back visual content (such as images or video) on an electronic display 110, and the like. The presentation module 302 may present audio content by playing back audio files of the audio content, audibly narrating audio content, and the like.

The presentation module 302 may sequentially present the content. Sequentially presenting the content may include moving through the digital publication 106, presenting content in sequence as it is arranged in the digital publication 106. For example, the presentation module 302 may audibly narrate a digital publication 106, sequentially narrating the text content of the digital publication 106 in an order determined by an order that the content appears in the digital publication 106.

The presentation module 302 may access a digital publication 106 locally stored on a computing device 102 on which the presentation module 302 resides. For example, the presentation module 302 may reside on a portable computing device 102 storing a plurality of digital publications 106. The presentation module 302, in certain embodiments, may also present streaming digital publication 106 streamed from the Internet or another server separate from a computing device 102 on which the presentation module 302 resides.

The detection module 304, in one embodiment, detect customization tags in content of digital publications 106. A customization tag, in one embodiment, indicates a portion of the content that is customizable. A customization tag may be embodied as a predetermined indicator at a particular location in the content. In one embodiment, a customization tag includes text, symbols, or other data to indicate a customization tag. For example, with text content, a customization tag may be set apart from other content (e.g. text) with predetermined symbols or characters (e.g. brackets, ellipses, or the like). In one embodiment, a digital publication 106 includes one or more pre-defined customization tags. Customization tags may be inserted into a digital publication 106 by an author, a publisher, a digital publication producer, and/or the like. For example, as an author is writing a digital publication 106, the author may, instead of including a specific city name in the text, insert a customization tag to customize the city name.

In one embodiment, a customization tag is associated with customization content. Customization content may be text content, visual content, and/or audible content to be presented at a point in the digital publication 106 indicated by a customization tag. For example, customization content may embodied as one or more words, a sound effect, a song, an image, or the like to customize the digital publication 106. In certain embodiments, as described below, the customization content includes a character trait, a character name, a location trait, a location name, weather, and/or the like.

In one embodiment, a customization tag includes a unique identifier sufficient to identify subsequent instances of the customization tag. For example, an author may wish the main characters to visit the same restaurant on multiple occasions throughout a novel. The customization tag for the restaurant name may have a unique identifier such that the same restaurant name would appear in each instance of the customization tag to maintain consistency in the story.

In one embodiment, a customization tag includes information sufficient to specify customization content for presentation. In certain embodiments, a customization tag specifies specific content to present (e.g. a text segment, a sound effect, or the like), a specific type of content (e.g. a city name), or the like. A customization tag may specify whether to customize according to geographic location, a story element, a certain genre, mood or type of music, a certain sound effect, or the like. In one embodiment, a customization tag specifies an audio clip, an audio volume, and/or an audio duration. For example, a customization tag may specify that a sound effect of breaking dishes is to play at a particular volume.

A customization tag may indicate a portion of the content customizable according to a geographic location. Furthermore, the customization content associated with the customization tag may be associated with the geographic location. For example, a customization tag may call for customization content for a street name based on a certain geographic location, characters with character trait specific to a certain geographic location, location traits specific to a certain geographic location, or the like.

In one embodiment, the geographic location is a geographic location of a computing device 102 on which the apparatus resides and/or the computing device 102 that is in communication with the electronic display 110 displaying the content of the digital publication 106. Specifically, the geographic location may be an actual geographic location of a user (of the computing device 102). For example, if a user is in Dallas, Tex., reading a digital publication 106 on the user's portable computing device 102, the geographic location may be Dallas, Tex., the customization tag may be inserted in the digital publication 106 in a location in which a street is named, and the customization content may include a Dallas street name.

The geographic location, in certain embodiments, may be country-specific, region specific, landmark specific, neighborhood specific, or the like. For example, the geographic location may be based on a particular neighborhood of Dallas, Tex., and customization content may be specific to that neighborhood. In another example, the geographic location may be landmark specific, such as in a particular forest, mountain range, desert, or the like.

In one embodiment, the geographic location is determined by a user preference. In one embodiment, the user preference may override a geographic location of the computing device 102. For example, the geographic location of the computing device 102 (the actual geographic location) may be Phoenix, Ariz., but the user preference may be New York, N.Y. Therefore, the customization content may be specific to New York, N.Y.

The access module 306, in one embodiment, accesses the customization content associated with the customization tag. The access module 306 may select customization content for presentation. For example, the access module 306 may select customization content based on user preferences as described below, based on an index of customization tags to customization content as described below, based on the geographic location and/or parameters in the customization tag, and/or the like.

In one embodiment, the access module 306 uses information from the customization tag to select and/or access the customization content. For example, if the customization tag calls for an Italian restaurant name specific to a particular city, the access module 306 may use the geographic location (actual or user preference) to search customization content for an Italian restaurant name. In one embodiment, the customization content is stored locally on the computing device 102 on which the apparatus resides. The computing device 102 may store a variety of customization content (e.g. sound effects, places names, character traits, and the like) in a repository for customizing a variety of digital publications 106. In some embodiments, for audio content, the access module 306 accesses audio content stored locally in a user's music library on the user's computing device 102. The access module 306 may search the repository for particular text segments (e.g. with place names, character traits, and the like), particular sound effects, particular songs, and the like, that are specified by the customization tag.

In one embodiment, the access module 306 may access the customization content from a location external to the computing device 102. For example, the access module 306 may access the customization content from the Internet, a server in communication with the computing device 102, another computing device 102, or the like. The access module 306 accesses customization content from an audio server 204 such as that used for an Internet radio service, or the like.

In one embodiment, customization tags and their associated customization content are indexed, creating a relationship between each tag and each tag's content as described below. In this embodiment, the access module 306 may refer to the index and retrieve the customization content called for in the index.

The customization module 308, in one embodiment, presents the customization content. The customization module 308 may present the customization content for a particular customization tag at a point in the content indicated by the particular customization tag. The point in the content may be the location occupied by the customization tag and the customization module 308 substitutes the customization content in place of the customization tag. For example, if a customization tag is "<geographic city>," when the presentation module 302 reaches a location in the content in which the customization tag appears, the customization module 308 presents "Dallas," in place of the customization tag. Presenting customization content may include visually displaying the customization content (graphically depicting words, images, or video), playing audio customization content, audibly narrating the customization content, and/or the like.

In a first example, a user is in New York City. The digital publication 106 may be personalized to refer to the Empire State building as a site or Broadway as a street within the story. In a second example, the user has specified a favorite sports team as the Dallas Mavericks in the user preferences. The story may be modified to use the Mavericks team name in the story if the story includes a basketball/sports team as a story element.

In a third example, the user is near Miami Beach. The digital publication 106 may be modified to use the Fountain Blue Hotel as the hotel in the digital publication 106. In a fourth example, a user reading a digital publication 106 is on vacation in San Francisco (set as the geographic location in personal preferences or obtained by a GPS as described below). The digital publication 106 is personalized to use Golden Gate Park as the location of a park scene. Sounds during the digital publication 106 may include cable cars while the story is near a street or sounds of sea lions while the story is near the water. When rock music is required during scenes of the story, the Grateful Dead could be played (the band is from San Francisco and continues to have a large following there).

In a fifth example, user is on vacation in Sweden. The main characters in the digital publication 106 may include features, such as hair color and eye color, customized to Sweden (e.g. blonde hair and blue eyes).

In one embodiment, customization content may be classified as persistent or non-persistent in relation to a geographic location. Persistent customization content may be set to an initial, persistent geographic location. If a geographic location changes to a second geographic location after the persistent customization content has been set to the first geographic location, the customization content may remain associated with the first geographic location. For example, if a user begins reading a digital publication 106 while at the airport in Dallas, Dallas being set as the persistent geographic location, and the user flies to Phoenix, Ariz., if the customization content is persistent customization content, the customization content will remain associated with Dallas.

Non-persistent customization content may be associated with a current geographic location. In one embodiment, if a geographic location changes from a first geographic location to a second geographic location, the customization content subsequent to the change will be associated with the second geographic location. For example, if a user begins reading a digital publication 106 while at the airport in Dallas, and customization content is specific to Dallas, and the user flies to Phoenix, Ariz., the customization content subsequent to the change may be associated with Phoenix. Whether customization content is persistent or non-persistent may, in various embodiments, be determined by a user preference, by an author, distributor or producer of the digital publication 106, by customization tags (e.g. certain customization tags may call for persistent customization content), and/or the like.

Figure 4:
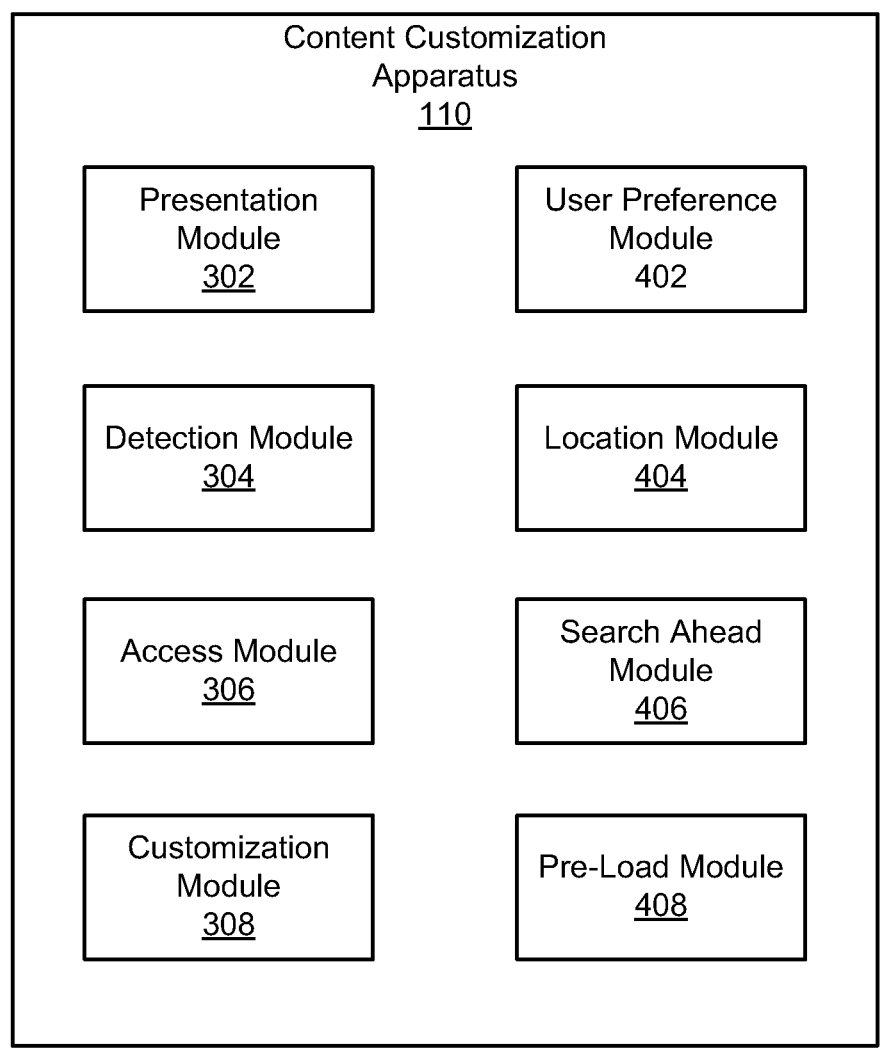
FIG. 4 is a schematic block diagram illustrating another embodiment of an apparatus for dynamically customizing a digital publication in accordance with the present invention.

FIG. 4 is a schematic block diagram illustrating another embodiment of an apparatus 400 for dynamically customizing a digital publication 106. The apparatus 400 includes an embodiment of a content customization apparatus 106 with a presentation module 302, a detection module 304, an access module 306, and a customization module 308, which are substantially similar to those described in relation to the apparatus 300 of FIG. 3. In addition, the embodiment of the content customization apparatus 106 may include one or more of a user preference module 402, a location module 404, a search-ahead module 406, and a pre-load module 408, which are described below.

The user preference module 402 receives, maintains, and/or references user preferences. These user preferences may include, but are not limited to a geographic location preference, audio content preferences, music preferences, volume preferences, customization content persistence preferences, and/or the like.

In one embodiment, the user preference module 402 references user preferences and the customization content is based at least in part of one or more of the user preferences. The access module 306 may signal the user preference module 402 to reference a user's music preferences for customization content that includes a song. The user preference module 402 may reference and return the user's music preferences to the access module 306 and the access module 306 may select a song as the customization content based on the music preferences. For example, a user's music preference may be a preference for country music and the access module 306 may select a country song for customization content. In certain embodiments, user preferences may include a preferred model of car, sports team, food, clothing, or the like, and a digital publication 106 may be customized to include such preferences.

In one embodiment, user preferences are entered by a user. In another embodiment, the user preference module 402 determines user preferences based on audio content, including songs, stored on a computing device 102 and/or audio content associated with a user's Internet music account. For example, the user preference module 402 may search the computing device 102 for songs and/or song preferences and determine that the user prefers country music in response to a majority of songs on the computing device 102 being country songs.

The location module 404, in one embodiment, obtains the geographic location for use with the customization content as described above. The geographic location may be an actual geographic location (e.g. of the computing device 102 on which the apparatus resides). The location module 404 may obtain the geographic location from a Global Positioning System (GPS) device in communication with the computing device 102 as is known in the art.

In certain embodiments, the location module 404 may obtain the geographic location from a mobile phone localization process. For example, if the computing device 102 is a mobile phone, a mobile phone localization process may include using multilateration of radio signals between multiple cellphone radio towers (e.g. cellphone triangulation). Specifically, by comparing the relative signal strength from multiple cellphone towers, a location of a cellphone may be approximated. In one embodiment, the location module 404 may interface with a cellphone service provider and retrieve location data obtained from cellphone triangulation. In another embodiment, the location module 404 determines the device location by identifying a location of a network, such as a Local Area Network ("LAN") or Wireless Local Area Network ("WLAN") with which the computing device 102 communicates, and/or the like.

In another embodiment, the location module 404 obtains the geographic location from a user preference. For example, the user may have entered in a current city or a preferred city as a user preference.

The search-ahead module 406, in one embodiment, searches ahead of a current presentation location in the content for customization tags. The current presentation location may be a location in the content currently being presented by the presentation module 302. Therefore, the search-ahead module 406 may detect a customization tag at a location in the content ahead of the current presentation location. The search-ahead module 406 may parse text of the digital publication 106, searching ahead in the parsed text for customization tags. In one embodiment, the search-ahead module 406 communicates with and/or includes a portion of the detection module 304. Searching ahead of the current presentation location may allow the pre-load module 408, described below, to pre-load customization content and/or index customization content by associating customization content with customization tags.

The pre-load module 408, in one embodiment, pre-loads customization content for a particular customization tag prior to presenting the customization content for the particular customization tag in response to the search-ahead module 406 detecting the customization tag at a location in the content ahead of the current presentation location. Pre-loading customization content may include caching customization content (copying customization content to high speed memory or downloading customization content from the Internet) such that the customization module 308 may present the customization content at the appropriate location in the digital publication 106.

In one embodiment, the pre-load module 408 indexes customization tags and their associated customization content by creating a relationship between each tag and each tag's content. In this embodiment, the access module 306 may refer to the index and retrieve the customization content called for in the index. In one embodiment, the index includes a storage location of the customization content.

FIG. 5A is a schematic block diagram illustrating one embodiment of a digital publication 500 with a plurality of customization tags 502. The digital publication 500 includes content (e.g. text) 504 and a plurality of customization tags 502 for customizing various aspects of the story according to a geographic location. In the depicted embodiment, the customization tags 502 specify customization of a city, vegetation, clothing, a sports team, and foot wear. The depicted customization tags 506 comprise a non-limiting example and the customization tags 502 may include more or less information than that depicted in various embodiments.

For example, FIG. 5B depicts the digital publication 500 of FIG. 5A, customized with customization content 506 according to the geographic location of Phoenix, Ariz. The city name has been customized with customization content to Phoenix, the vegetation has been customized to cactuses, the clothing has been customized to a t-shirt and shorts, the footwear to flip-flops, and the like.

FIG. 5C depicts the digital publication 500 of FIG. 5A, customized with customization content 508 according to the geographic location of Manhattan. The city name has been customized with customization content to Manhattan, the vegetation has been customized to oak trees, the clothing has been customized to a jacket and pants, the footwear to boots, and the like.

Figure 6:
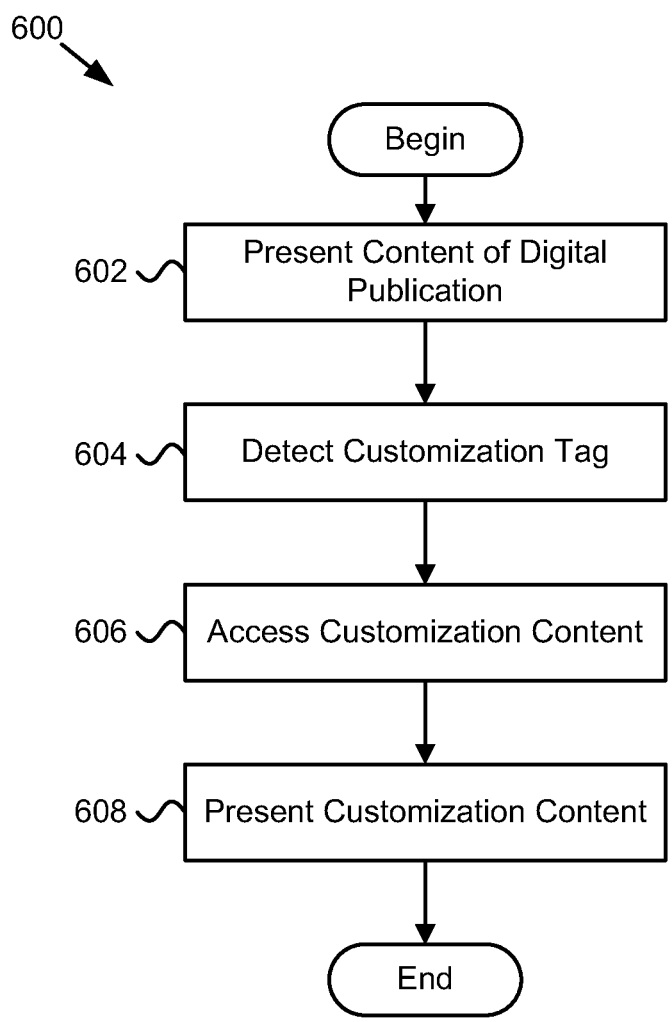
FIG. 6 is a schematic flow chart diagram illustrating one embodiment of a method for dynamically customizing a digital publication in accordance with the present invention.

FIG. 6 is a schematic flow chart diagram illustrating one embodiment of a method 600 for dynamically customizing a digital publication 106. The method 600 begins and the presentation module 302 sequentially presents 602 content of a digital publication 106. The presentation module 302 may present the content by visually displaying the content on an electronic display and/or audibly narrating the content. The detection module 304 detects 604 a customization tag in the content. The customization tag, in one embodiment, indicates a portion of the content customizable according to a geographic location. The customization tag may be associated with customization content. The customization content may be associated with the geographic location.

The access module 306 accesses 606 the customization content associated with the customization tag. The customization content includes text content, visual content, and/or audible content. The customization module 308 presents 608 the customization content at a point in the content indicated by the customization tag. Then the method 600 ends.

Figure 7:
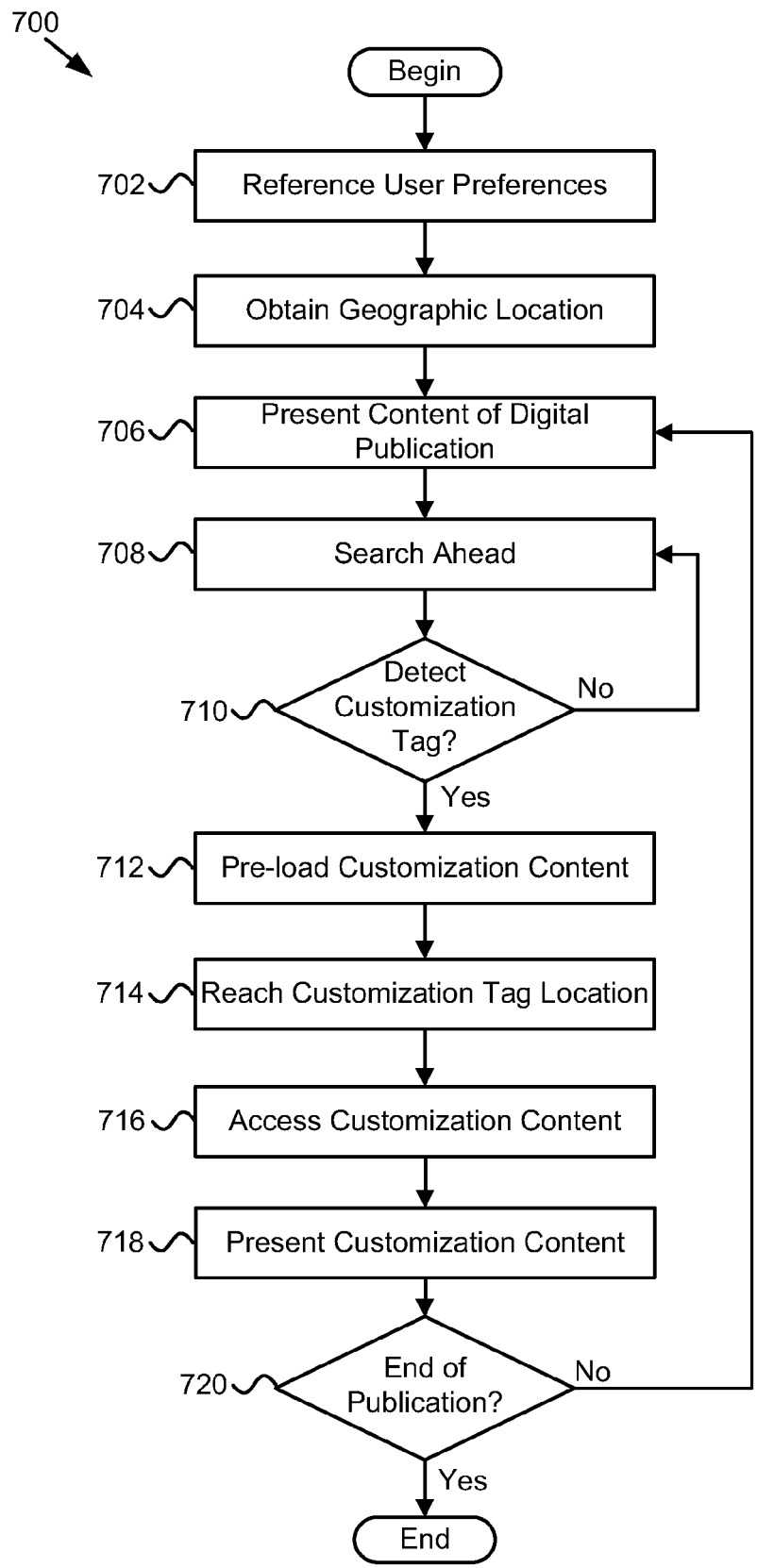
FIG. 7 is a schematic flow chart diagram illustrating another embodiment of a method for dynamically customizing a digital publication in accordance with the present invention.

FIG. 7 is a schematic flow chart diagram illustrating another embodiment of a method 700 for dynamically customizing a digital publication 106. The method 700 begins and the user preference module 402 references 702 user preferences. These user preferences may include, but are not limited to a geographic location preference, audio content preferences, music preferences, volume preferences, and customization content persistence preferences. The location module 404 obtains 704 a geographic location for use in content customization. In one embodiment, the geographic location is a geographic location of a computing device 102 that will sequentially present the content and is communication with an electronic display for presentation of the content. In a further embodiment, the location module 404 obtains the geographic location of the computing device 102 from a Global Positioning System (GPS) device 108 in communication with the computing device 102, a mobile phone localization process, or a network in communication with the computing device 102.

In one embodiment, the location module 404 obtains the geographic location by referencing a user preference for the geographic location. The geographic location of the user preference may be consistent with the geographic location of the computing device 102. However, in one embodiment, the user preference overrides a geographic location of the computing device 102. For example, if the user lives in Dallas, Tex. but prefers to have digital publications 106 customized for New York, the user preference of New York may override the actual geographic location of Dallas, Tex. and the location module may obtain New York as the geographic location.

The presentation module 302 sequentially presents 706 content of a digital publication 106 by visually displaying the content on a display and/or audibly narrating the content. The search-ahead module 406 searches ahead 708 of a current presentation location in the content for a customization tag. For example, the search-ahead module 406 may search ahead a predetermined distance in the digital publication 106 (e.g. a predetermined number of words or a predetermined length of time). If the detection module 304 does not detect 710 a customization tag, the search-ahead module 406 continues to search ahead 708 for a customization tag. If the detection module 304 detects 710 a customization tag in the content (e.g. at a location in the content ahead of the current presentation location), the pre-load module 408 pre-loads 712 the customization content.

The presentation module 302 reaches 714 the customization tag location and the access module 306 accesses 716 the customization content associated with the customization tag. The customization content includes text content, visual content, and/or audible content and may be based on the geographic location. The customization module 308 presents 718 the customization content at a point in the content indicated by the customization tag. If there is no more content 720 in the digital publication 106, the method 700 ends. Alternatively, the method 700 continues with step 706 and the presentation module 302 presents 706 the contents of the digital publication 106.

Figure 8:
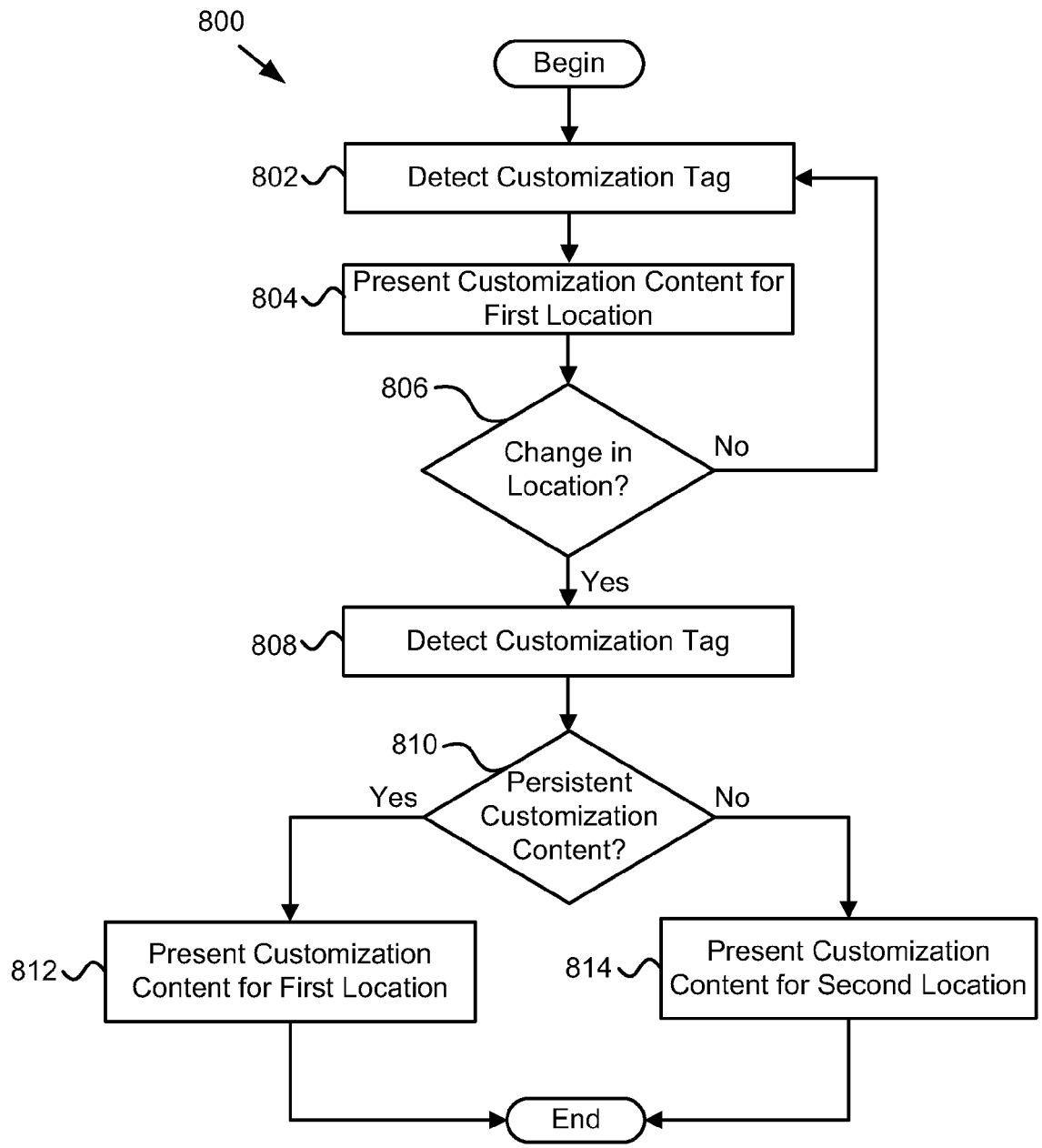
FIG. 8 is a schematic flow chart diagram illustrating one embodiment of a method for presenting customization content in accordance with the present invention.

FIG. 8 is a schematic flow chart diagram illustrating one embodiment of a method 800 for presenting customization content. The method 800 begins and the detection module 304 detects 802 a customization tag in content of a digital publication 106 being presented by the presentation module 302. The customization module 308 presents 804 customization content associated with the customization tag. The customization module 308 presents customization content associated with a first geographic location. In one embodiment, the first geographic location is a current geographic location, or a location of a computing device 102 on which the digital publication 106 is being presented.

If the location module 404 does not detect 806 a change in the current geographic location and the detection module 304 detects 808 a subsequent customization tag, the customization module 308 presents 802 customization content associated with the first geographic location for the subsequent customization tag. Alternatively, if the location module 404 detects 806 a change in the current geographic location from the first geographic location to a second geographic location different from the first geographic location, the customization module 308 determines 810 whether the customization content for the customization tag is persistent customization content or non-persistent customization content.

In one embodiment, the customization content is persistent customization content and the first geographic location is a persistent geographic location. If the customization module 308 determines 810 that the customization content is persistent customization content, the presentation module 302 presents 812 customization content associated with the first geographic location for the subsequent customization tag, even though the current geographic location has been changed to the second geographic location. Then the method 800 ends.

Alternatively, if the customization module 308 determines 810 that the customization content is non-persistent customization content, the customization module 308 presents 814 customization content associated with the second geographic location for the subsequent customization tag and the method 800 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

sequentially presenting content of a digital publication by one or more of visually displaying the content on an electronic display of an electronic book reader and audibly narrating the content in the electronic book reader, the content of the digital publication comprising text content of a book, the text content being presented according to a predetermined order;

determining a first geographic location of the electronic book reader;

parsing the text content ahead of a current presentation location in the text content for a customization tag, the current presentation location comprising a location in the text content currently being presented on the electronic book reader;

detecting a customization tag in the text content at a location in the text content ahead of the current presentation location, the customization tag indicating a portion of the text content customizable according to the first geographic location of the electronic book reader, the customization tag associated with customization content, the customization content associated with the first geographic location;

accessing the customization content associated with the customization tag, the customization content comprising one or more of text content, visual content, and audible content;

pre-loading the customization content in response to detecting the customization tag at a location in the text content ahead of the current presentation location;

presenting the customization content at a point in the text content indicated by the customization tag;

detecting the first geographic location of the electronic book reader change from the first geographic location to a second geographic location different from the first geographic location; and dynamically changing the customization content for the customization tag from content associated with the first geographic location to content associated with the second geographic location while the text content is presented on the electronic book reader in response to detecting the geographic location change from the first geographic location to the second geographic location.

2. The method of claim 1, wherein the geographic location comprises a geographic location of a computing device in communication with the electronic display, the computing device sequentially presenting the content and wherein the method further comprises obtaining the geographic location of the computing device.

3. The method of claim 2, wherein obtaining the geographic location of the computing device further comprises obtaining the geographic location from one or more of a user preference, a Global Positioning System (GPS) device in communication with the computing device, a mobile phone localization process, and a network in communication with the computing device.

4. The method of claim 1, wherein the geographic location comprises a user preference, the user preference overriding a geographic location of a computing device in communication with the electronic display, the computing device sequentially presenting the content.

5. The method of claim 1, wherein the customization tag specifies one or more of a text segment, an audio clip, an audio volume, and an audio duration.

6. The method of claim 1, wherein the customization content comprises non-persistent customization content, the non-persistent customization content associated with a current geographic location.

7. The method of claim 1, wherein the customization content comprises persistent customization content, the persistent customization content associated with a persistent geographic location.

8. The method of claim 7, wherein a current geographic location comprises a first geographic location and wherein the persistent geographic location comprises the first geographic location, the method further comprising:
presenting the customization content for the customization tag, the customization content associated with the first geographic location;
detecting the current geographic location change from the first geographic location to a second geographic location different from the first geographic location; and
presenting the customization content for the customization tag subsequent to detecting the current geographic location change from the first geographic location to the second geographic location, the customization content associated with the first geographic location.

9. The method of claim 1, further comprising referencing a plurality of user preferences wherein the customization content is based at least in part of one or more of the plurality of user preferences.

10. The method of claim 9, further comprising determining the plurality of user preferences based on one or more of audio content stored on a computing device and audio content associated with a user's Internet music account.

11. The method of claim 1, wherein the customization content comprises one of a character trait, a character name, a location trait, a location name, weather, a song, and a sound effect.

12. An apparatus comprising:
a presentation module that sequentially presents content of a digital publication by one or more of visually displaying the content on an electronic display of an electronic book reader and audibly narrating the content in the electronic book reader, the content of the digital publication comprising text content of a book, the text content being presented according to a predetermined order;
a location module that determines a first location of the electronic book reader;
a search-ahead module that parses the text content ahead of a current presentation location in the text content for a customization tag, the current presentation location comprising a location in the text content currently being presented on the electronic book reader;
a detection module that detects a customization tag in the text content at a location in the text content ahead of the current presentation location, the customization tag indicating a portion of the content customizable according to the first geographic location of the electronic book reader, the customization tag associated with customization content, the customization content associated with the first geographic location;
an access module that accesses the customization content associated with the customization tag, the customization content comprising one or more of text content, visual content, and audible content;
a pre-load module that pre-loads the customization content in response to detecting the customization tag at a location in the text content ahead of the current presentation location; and
a customization module that presents the customization content associated with the first geographic location at a point in the content indicated by the customization tag, the customization content being dynamically changed from content associated with the first geographic location to content associated with the second geographic location while the text content is presented on the electronic book reader in response to detecting a change of the first geographic location of the electronic book reader to a second geographic location is detected, the second geographic location being different than the first geographic location.

13. The apparatus of claim 12, wherein the geographic location comprises a geographic location of a computing device in communication with the electronic display, the computing device sequentially presenting the content and wherein the apparatus further comprises a location module that obtains the geographic location of the computing device.

14. The apparatus of claim 12, further comprising:
a memory storing one or more of the presentation module, the detection module, the access module, and the customization module; and
a processor in communication with the memory and the electronic display, the processor executing one or more of the presentation module, the detection module, the access module, and the customization module.

15. A computer program product comprising a computer readable storage medium having computer readable program code embodied therewith, the computer readable program code for:
sequentially presenting content of a digital publication by one or more of visually displaying the content on an electronic display of an electronic book reader and audibly narrating the content in the electronic book reader, the content of the digital publication comprising text content of a book, the text content being presented according to a predetermined order;
determining a first geographic location of the electronic book reader;

parsing the text content ahead of a current presentation location in the text content for a customization tag, the current presentation location comprising a location in the text content currently being presented on the electronic book reader;

detecting a customization tag in the text content at a location in the text content ahead of the current presentation location, the customization tag indicating a portion of the text content customizable according to a first geographic location of the electronic book reader, the customization tag associated with customization content, the customization content associated with the first geographic location;

accessing the customization content associated with the customization tag, the customization content comprising one or more of text content, visual content, and audible content;

pre-loading the customization content in response to detecting the customization tag at a location in the text content ahead of the current presentation location;

presenting the customization content at a point in the text content indicated by the customization tag;

detecting the first geographic location of the electronic book reader change from the first geographic location to a second geographic location different from the first geographic location; and dynamically changing the customization content for the customization tag from content associated with the first geographic location to content associated with the second geographic location while the text content is presented on the electronic book reader in response to detecting the geographic location change from the first geographic location to the second geographic location.

16. The computer program product of claim 15, further comprising searching ahead of a current presentation location in the content for the customization tag, the current presentation location comprising a location in the content currently being presented, wherein detecting the customization tag in the content further comprises detecting the customization tag at a location in the content ahead of the current presentation location.

17. The computer program product of claim 16, further comprising pre-loading the customization content prior to presenting the customization content in response to detecting the customization tag at a location in the content ahead of the current presentation location.

* * * * *